April 17, 1962 W. STELZER 3,030,127
DETENT MEANS FOR PREVENTING THE UNCOUPLING OF BAYONET JOINTS
Filed Oct. 26, 1959 2 Sheets-Sheet 2

INVENTOR
WILLIAM STELZER

BY John F. Phillips
ATTORNEY

United States Patent Office 3,030,127
Patented Apr. 17, 1962

3,030,127
DETENT MEANS FOR PREVENTING THE UN-
COUPLING OF BAYONET JOINTS
William Stelzer, Bloomfield Hills, Mich., assignor to Kelsey-Hayes Company, Detroit, Mich., a corporation of Delaware
Filed Oct. 26, 1959, Ser. No. 848,807
3 Claims. (Cl. 285—91)

This invention relates to a casing structure for fluid pressure motors and the like.

It is the common practice in the manufacture of fluid pressure motors, for example the booster motors used in the operation of vehicle brake systems, to form a two-part casing structure having means at the edges thereof for securing such edges together to form a complete housing for the pressure responsive units of the motors and the other elements associated therewith. The means commonly employed have been relatively expensive and involved assembly problems which were time-consuming.

An important object of the present invention is to provide a casing structure of the character referred to formed of complementary sections, and to provide novel easily operable means for joining and locking the casing sections to each other.

A further object is to provide a casing structure of the character referred to wherein the casing sections are formed of portions engageable with each other to prevent relative movement of the casing sections in every direction but one, and to provide novel means engaging the casing sections after they have been assembled with respect to each other to prevent such one relative movement between the casing sections, thus locking them together against separation.

A further object is to provide an arrangement of casing section parts as described above wherein the ends of the casing sections may be brought into predetermined position and then rotated to lock them against axial separation, and to provide novel means interengageable with the casing sections to prevent relative reverse rotation thereof and thus lock the casing sections to each other in proper assembled relationship.

A further object is to provide such a structure wherein the locking means is quickly and easily applied and which may be detached to unlock the casing sections from each other in the event servicing of the parts within the casing becomes necessary.

Other objects and advantages of the invention will become apparent during the course of the following description.

In the drawings I have shown one embodiment of the invention. In this showing:

Figure 1:
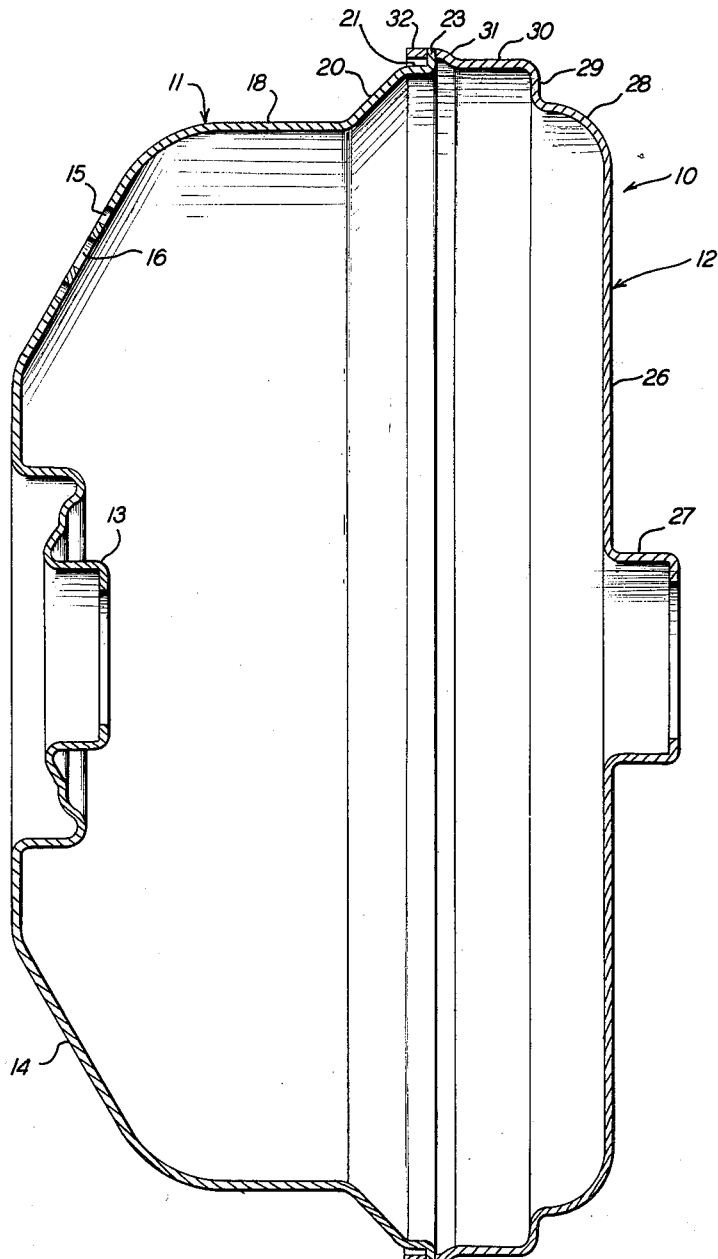
FIGURE 1 is an axial sectional view through the assembled casing structure.

Referring to FIGURE 1, the numeral 10 designates the casing as a whole, particularly intended for use as the housing means for a fluid pressure motor structure, for example such a structure used as a booster motor for vehicle brake systems. The casing comprises sections 11 and 12, the former of which is provided with a hub structure 13 for housing bearing and sealing means for a reciprocating part of the motor. Such reciprocating part commonly operates the plunger of a master cylinder fixed to the casing section 11. In the present instance, the casing section 11 is shown as being provided with a generally conical wall section 14 apertured as at 15 for connection with a check valve leading to a source of vacuum or other relatively low pressure, an opening 16 being provided for the passage therethrough of a screw or similar device for securing the check valve in position.

The casing section 11 is also shown as comprising a cylindrical wall portion 18, and toward the free end thereof, the casing section 11 flares outwardly in a conical portion 20 and then terminates in a short cylindrical section 21. Such cylindrical section has at the free edge thereof circumferentially spaced radial fingers 23 for a purpose to be described.

The casing section 12 is provided with a radial wall portion 26 axially of which is formed a hub 27 to receive certain interior elements of the motor structure and through the axial opening in which extends the means for operating the valve mechanism of the motor. The outer extremity of the wall portion 26 curves inwardly as at 28, then radially outwardly as at 29, and then extends cylindrically as at 30. At the extremity of the cylindrical portion 30, the casing section 12 flares outwardly annularly as at 31, the casing section terminating in a cylindrical flange 32.

The cylindrical flange 32 is provided at circumferentially spaced points with bayonet slots 35 having circumferential inner extensions 36 adapted to receive the radial fingers 23. It will be obvious that the bayonet slots 35 correspond in number and arrangement to the fingers 23 and that the open ends of the slots 35 are of sufficient width for movement thereinto of the fingers 23.

One of the bayonet slots, indicated by the numeral 38, is formed somewhat differently from the remaining bayonet slots. As in the case of the other bayonet slots, the slot 38 has a circumferentially extending inner end 36 opposite which the slot 38 has an offset portion 40. This, in effect, forms the right-hand extremity (FIGURE 3) of the open end of the slot 38 substantially wider than is true of the remaining slots 35.

Figures 2, 3:
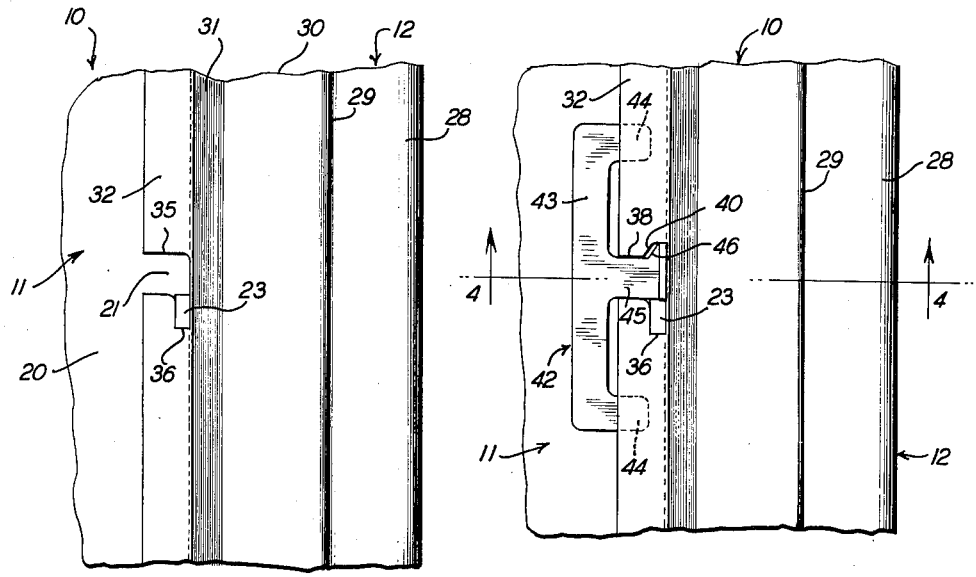
FIGURE 2 is an enlarged fragmentary face view of adjacent portions of the casing sections showing one of the interengaging means for locking the casing sections against relative axial movement.
FIGURE 3 is a similar view showing one of the interengaging means between the casing sections, together with a locking key used in conjunction therewith.
Figure 5:
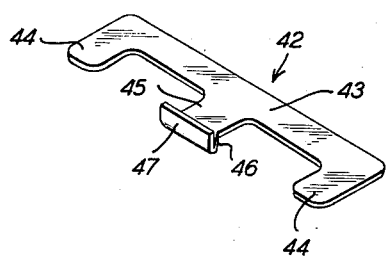
FIGURE 5 is a perspective view of the locking key.
Figure 4:
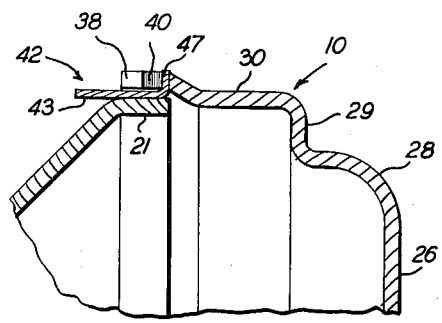
FIGURE 4 is a fragmentary sectional view on line 4—4 of FIGURE 3.

The slot 38 is employed in conjunction with a locking key indicated as a whole by the numeral 42 and shown in detail in FIGURES 3, 4 and 5. This key is substantially E-shaped as shown. The key comprises a preferably normally flat elongated body 43 and end laterally extending arms or fingers 44. The key also includes a central arm or finger 45 extending generally parallel to the arms or fingers 44 centrally of the length of the body 43. Near its extremity, the arm or finger 45 is widened as at 46 and terminates in a locking finger 47 generally perpendicular to the plane of the body 43 and arms or fingers 44 and 45. As stated, the key 42 is preferably normally flat and is formed of suitable material such as steel having a substantial degree of resiliency.

Operation

The internal parts of the motor (not shown) are assembled relative to each other and, in most instances, are assembled within the casing section 11, whereupon the casing section 12 is moved into position to be locked relative to the casing section 11. This operation is performed by sliding the open ends of the bayonet slots 35 over the fingers 23, whereupon the casing section 12 is rotated relative to the casing section 11 so that the fingers 23 move relatively into the bayonet slot ends 36, as shown in FIGURE 2. Under such conditions, the two casing sections will be locked against movement relative to each other in every direction except for relative rotation in a direction opposite that previously described.

Such assembly of the parts having been completed, the locking key 42 is then placed in position. This accomplished by relatively flexing the free end of the arm 45 radially outwardly of the flange 32 while the arms 44 are flexed radially inwardly to permit them to slide beneath the flange 32. This operation is accomplished by flexing the key body 43 so as to curve it from end to end. The lower edge of the key arm 45, as viewed in FIGURE 3, is placed in position to be substantially coincident with the lower edge of the open end of the slot 38, in which case the widened arm end 46 will lie over the flange 32 to be supported thereby. Force is then exerted against the left-hand edge of the key body 43, as viewed in FIGURE 3, to force it to the right. Between the widened end 46 and the body 43, the arm 45 is not greater in width than the width of the open end of the bayonet slot 38. Therefore, when the key has been moved to the right to the position shown in FIGURE 3, the arm 45 will snap downwardly through the open end of the slot 38. The key will now occupy the position shown in FIGURES 3 and 4, the finger 47 extending radially outwardly as in FIGURE 4 and bridging the gap between the adjacent finger 23 and the opposite or offset portion 40 of the associated bayonet slot. Under such conditions, the two casing sections are incapable of relatively reverse rotation. Accordingly, all of the fingers 23 of the casing section 11 will be securely locked against movement out of the slot portions 36. Therefore the two casing sections will be securely locked together.

Since the key body 43 is normally flat and the key is formed of resilient material, it will be apparent that the arms 44 will be maintained in engagement with the inner face of the flange 32. Because the body 43 tends to return to its normal shape, the arm 45 will be held flexed radially inwardly against the casing flange 21 as shown in FIGURE 4. Accordingly, it will be impossible for the arm 45 to move relatively outwardly to become released from the flange 32.

From the foregoing, it will be apparent that the present construction provides novel easily operable means for locking together two stamped or otherwise shaped casing sections. It merely is necessary to move the sections into engagement with each other as described above, rotate them to a relatively slight extent, and then insert in position the single key which prevents reverse rotation of the casing sections. Any number of fingers 23 and bayonet slots 35 may be employed, while only a single key 42 is necessary.

If for any reason it becomes desirable to release the casing sections, for example for the purpose of servicing the motor parts, a screwdriver or other implement may be inserted beneath the arm 45 to force it upwardly, whereupon the finger 47 may be tapped with a hammer to release the key from the casing. If desired, a suitable implement may be used, engageable with the edge portion of the body 43 opposite the arms 45 and finger 47, to flex the arms 44 radially inwardly and to flex the arm 45 radially outwardly to release the key from engagement with the casing sections to permit its removal.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A casing structure comprising a pair of casing sections having annular edge portions each provided with inner and outer circumferential surfaces adapted to be brought into contiguous relationship with each other, a plurality of circumferentially spaced lugs carried on the inner of said casing sections, the outer of said casing sections being provided with a plurality of bayonet slots corresponding in number and arrangement to said lugs and movable into a cooperative relationship in which said casing sections are locked against movement relative to each other except in one direction, said bayonet slots each having an open end and an inner end extending circumferentially away from said open end, and an integral resilient key formed from flat material having end portions frictionally engaging one of said surfaces of said edge portion of the outer of said casing sections and an intermediate portion engaging the opposite surface of said edge portion of the other casing section, said key having an arm intermediate said end portions provided with a bent finger which passes over the surface of the outer casing section opposite that surface engaged by said end portions and snaps radially into one of said bayonet slots thereby engaging one of said lugs to prevent relative movement of said casing sections in said one direction to thereby lock said casing sections to each other, said bent finger extending radially at least substantially through the outer casing section and being of a width greater than the open end of said bayonet slot.

2. A casing structure according to claim 1, wherein said arm is of a width less than the width of the open end of said slot to move radially therethrough.

3. A casing structure according to claim 1, wherein said one bayonet slot is extended circumferentially of said outer casing section away from said inner end of said bayonet slot to provide a locking edge, said finger engaging at circumferentially opposite ends with said locking edge and with the associated lug.

References Cited in the file of this patent

UNITED STATES PATENTS

| | | |
|---|---|---|
| 808,008 | Cagle | Dec. 19, 1905 |
| 1,047,542 | Lofland | Dec. 17, 1912 |
| 1,128,634 | Talbot | Feb. 16, 1915 |
| 2,137,571 | Glauber | Nov. 22, 1938 |